United States Patent [19]
Prentice et al.

[11] Patent Number: 5,333,085
[45] Date of Patent: Jul. 26, 1994

[54] READ/WRITE GIMBAL WITH LIMITED RANGE OF MOTION

[75] Inventors: Thomas R. Prentice, Hunt County, Tex.; Robin O. Hammar; Sanjoy Ghose, both of Santa Cruz County, Calif.

[73] Assignee: Seagate Technology, Inc., Scotts Valley, Calif.

[21] Appl. No.: 136,488

[22] Filed: Oct. 13, 1993

Related U.S. Application Data

[63] Continuation of Ser. No. 18,331, Feb. 10, 1993, abandoned, which is a continuation of Ser. No. 610,379, Nov. 6, 1990, abandoned.

[51] Int. Cl.$^5$ .................. G11B 21/20; G11B 21/21
[52] U.S. Cl. ........................ 360/104; 360/103
[58] Field of Search ................ 360/103, 104, 105

[56] References Cited

U.S. PATENT DOCUMENTS

4,724,500 2/1988 Dalziel ................. 360/103

Primary Examiner—Robert S. Tupper
Attorney, Agent, or Firm—Flehr, Hohbach, Test, Albritton & Herbert

[57] ABSTRACT

A read/write head gimbal is provided including a tab or extension on the end of the gimbal portion which is attached to the head/slider assembly, forming this tab such that, when the gimbal is assembled to the load beam, the formed tab passes through an opening created for this purpose in the load beam, and extends beyond the opening far enough to prevent its returning through the opening after the gimbal and load beam are spot welded together. The tab and opening in the load beam are dimensioned so that during normal read/write operations, there is no contact between the tab and the sides of the opening in the load beam. The tab/opening arrangement is such that shock forces in the direction of travel away from the load beam, or in parallel with the surface of the load beam bracing the gimbal, will result in contact between the tab and the sides of the opening in the load beam, thus preventing excessive motion of the gimbal which could result in permanent deformation of the gimbal.

18 Claims, 7 Drawing Sheets

FIG. 1

*PRIOR ART*

READ/WRITE GIMBAL WITH LIMITED RANGE OF MOTION

This is a continuation of application Ser. No. 08/018,331 filed Feb. 10, 1993, now abandoned, which is a continuation of Ser. No. 07/610,379 filed Nov. 6, 1990, now abandoned.

FIELD OF THE INVENTION

This invention relates generally to the field of rigid disc drive data storage devices and more particularly, to an improved gimbal which mounts the read/write head used for recording and reading data. It is most useful in disc drives which incorporate ramp devices for loading the heads into engagement with the discs at power-on and unloading the heads from engagement with the discs at power-down.

BACKGROUND OF THE INVENTION

Disc drives incorporating head ramping devices are well known in the industry. Examples of this type of machine are disclosed in U.S. Pat. No. 4,535,374 (Amcodyne) and PCT Application Number US89/00785 (Prairietek). In each of these patents the read/write heads are attached to a gimbal device, which in turn is attached to a lead beam mounted to an actuator which moves the heads to the desired location on the disc surface. Prior to the application of power to the disc drive—and subsequent to the detection of a power loss—the heads are removed from engagement with the disc surfaces and suspended in their "parked" position by contact between the load beam and some sort of ramp or camming device located adjacent the outer diameter of the discs.

The read/write head of these types of devices typically consists of either an interrupted ferrite ring wrapped with wires for inducing or sensing magnetic flux variations in the disc surface, or an analogous arrangement created using thin-film deposition techniques. Whichever type of head is used, it is appropriately mounted to a "slider" which supports the head and allows attachment to the other elements of the system. For purposes of this discussion, the terms "head" and "slider" should be construed to refer to this head/slider subassembly unless specifically stated to the contrary.

In these prior art machines, the read/write heads "fly" on a thin layer of air called an "air bearing" which is created by the air frictionally dragged along by the spinning of the disc, acting in concert with co-operative flat surfaces on the bottom of the slider. These flat surfaces are referred to as "air bearing surfaces" or ABS.

The prior art gimbal of these assemblies has been further described in U.S. Pat. No. 4,176,765 and 3,931,641 (Watrous), and in U.S. Pat. No. 4,868,694 which is assigned to the assignee of the present invention. The gimbal is incorporated to compensate for small variations in the roll, pitch and skew of the read/write heads as assembled, and to create conformance between the surface of the spinning disc and the ABS of the "slider". To accomplish this task, the gimbal is made from very thin stainless steel, typically 0.0015 inches thick. This material is sufficiently strong to support the head during normal operation, and yet flexible enough to allow the necessary gimballing action.

With the current industry trend towards laptop and "notebook" computers, there has been a corresponding need to produce disc drives that are both incorporated in smaller packages and able to withstand the higher shock and vibration forces that are naturally to be expected when computers of this type are being carried from place to place. Computer manufacturers are beginning to demand that all sub-assemblies of their systems be able to withstand non-operating shock loads in the range of 300 Gs. A typical solution to the problem of large shock loads has been to ramp load and unload the heads, thus preventing "head slap" or potentially damaging contact between the heads and discs.

While ramp loading/unloading obviates the risk of damage due to head slap, such large shocks create another mode for potential failure.

When read/write heads are ramp-parked off the surface of the disc, the only material supporting the slider itself is the relatively weak gimbal. Shock loads of 300 Gs have been shown to be large enough to permanently deform the gimbal, resulting in the inoperability of the entire disc drive.

OBJECTIVES OF THE INVENTION

It is an objective of the invention to provide an improved gimbal structure for mounting a read/write head in a rigid disc drive which will prevent permanent deformation of the gimbal under high shock loads which occur while the heads are parked on a ramp or other similar parking device.

It is another objective of the invention to produce a gimbal which operates during normal read/write operation just as the existing gimbal assembly.

It is another objective of the invention to produce the improved gimbal while maintaining or lowering the total mass of the gimbal/load beam assembly.

It is yet another objective of the invention to produce the improved gimbal with a minimum of tooling and/or part changes from existing devices.

SUMMARY OF THE INVENTION

The above-described objectives are attained in the present invention by providing a tab or extension on the end of the gimbal portion which is attached to the head/slider assembly, forming this tab such that, when the gimbal is assembled to the load beam, the formed tab passes through an opening created for this purpose in the load beam, and extends beyond the opening far enough to prevent its returning through the opening after the gimbal and load beam are spot welded together.

The tab and opening in the load beam are dimensioned so that during normal read/write operations, there is no contact between the tab and the sides of the opening in the load beam.

The tab/opening arrangement is such that shock forces in the direction of travel away from the load beam, or in parallel with the surface of the load beam bracing the gimbal, will result in contact between the tab and the sides of the opening in the load beam, thus preventing excessive motion of the gimbal which could result in permanent deformation of the gimbal.

DESCRIPTION OF THE DRAWINGS

The features and advantages of the invention may be best understood by referring to the accompanying drawing, wherein

FIG. 4 is an isometric drawing of the gimbal and a portion of the load beam of the present invention, shown in an unassembled condition;

FIG B is an isometric drawing of the gimbal and load beam of FIG. 4, shown as they would be assembled together;

DETAILED DESCRIPTION OF A PREFACED EMBODIMENT

Figure 11:
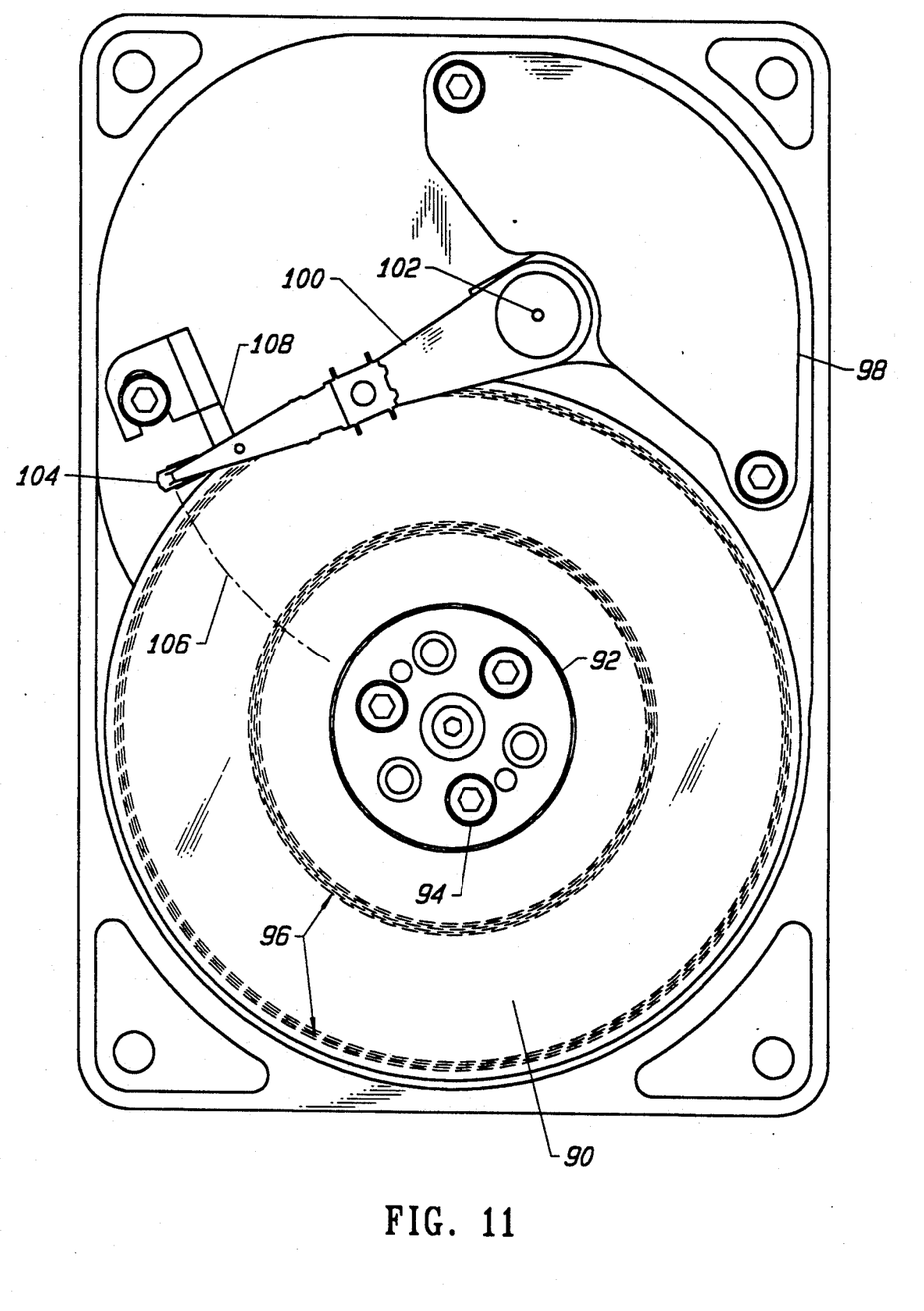
FIG. 11 is a plan view of a disc drive in which the present invention is particularly useful.

Shown in FIG. 12 is a plan view of a disc drive which incorporates a plurality of discs 90 mounted on a spindle motor by a disc clamp 92 and a plurality of screws 94. Each disc 90 contains a number of concentric, circular data tracks 96 on which data is written and from which data is read. An actuator motor, shown generally at 98, serves to pivot a plurality of head mounting arms 100 about a pivot point 102. Mounted to each head mounting arm 100 is a load beam/gimbal/head assembly 104 which is moved back and forth across the discs 90 along arc 106 in order to access the data tracks 96. Adjacent the outer diameter of the discs 90 and overhanging the outermost portion of the discs 90 are a number of ramps 108. When the control. electronics (not shown)detect the loss of power to the disc drive, the actuator motor 98 drives the head mounting arms 100 and the load beam/gimbal/head assembly 104 clockwise around the pivot 102 until the load beam/gimbal/head assembly 104 engages the ramp 108, at which point the head is lifted from the surface of the disc 90 and latched in position by a latching mechanism (not shown).

Figure 1:
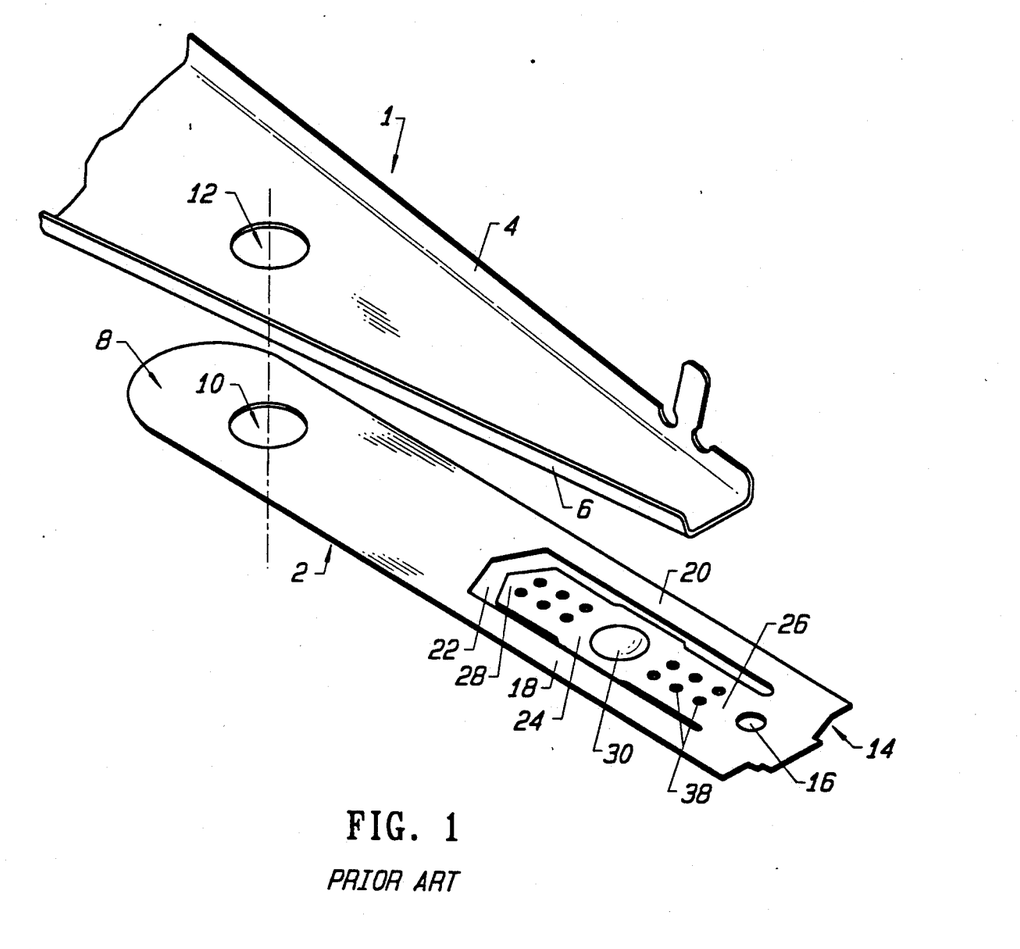
FIG. 1 is an isometric drawing of the gimbal and a portion of the load beam of the prior art, shown in an unassembled condition.

Referring next to FIG. 1, the load beam I and gimbal 2 of the prior art are shown in isometric view. As can be seen, the load beam 1 is shown only in partial view, as indicated by the wavy line. The portion of the load beam 1 not shown relates only to the mounting of the assembly to the actuator for moving the heads and is therefore not a part of this invention. The load beam 1 is made from material which is relatively heavier 0.0025 inch) than the gimbal 2 (0.0015 inch). The load beam 1 is essentially an elongated, truncated triangle with its outer edges bent to form side rails 4, 6. These rails 4, 6 add to the stiffness of the load beam 1. The major function of the load beam 1 is to provide the load force necessary to encourage the slider into cooperative arrangement with the air bearing.

The gimbal 2 is typically fabricated from 0.0015 inch thick stainless steel using the process of photo-etching or stamping.

The gimbal 2 consists of several portions having various functions. The mounting portion 8 of the gimbal 2 serves generally to provide an area in which the gimbal 2 and load beam 1 can be welded together. To facilitate this assembly, both the load beam 1 and the gimbal 2 have tooling holes 12, 10 which aid in aligning the parts for assembly.

The opposite end 14 of the gimbal 2 from the mounting portion 8 contains several features having various functions. A second tooling hole 16 is located in this portion of the gimbal 2, and is used to conjunction with the second above-mentioned tooling hole 10 to align the gimbal 2 in a fixture for spot-welding to the load beam 1. A pair of side arms 18, 20 coplanar with the mounting portion 8 extend from the mounting portion 8 to the end 14 of the gimbal 2. A generally U-shaped cutout 22, continuous at the end nearest the mounting portion 8 and open at the end farthest from the mounting portion 8, separates the side rails 18, 20 from the tongue 24 of the gimbal 2. The tongue 24 thus formed has both an attached end 26 and a free end 28. The gimbal 2 is stamped or press-formed to lower the tongue 24 below the plane of the side arms 18, 20 and the mounting portion 8. The slider (not shown in this drawing) that carries the read/write head is mounted on the lower surface of the tongue 24 and the "step-down" bending (described above) of the tongue 24 ensures a lack of interference between the upper surface of the slider and the side arms 18, 20. The tongue 24 also has a "dimple" 30 formed in its center projecting upward toward the load beam 1. The relationship of the gimbal 2 and its various parts to the load beam 1 is best seen in the cross-sectional views of FIGS. 2A and 2B.

Figure 2A:
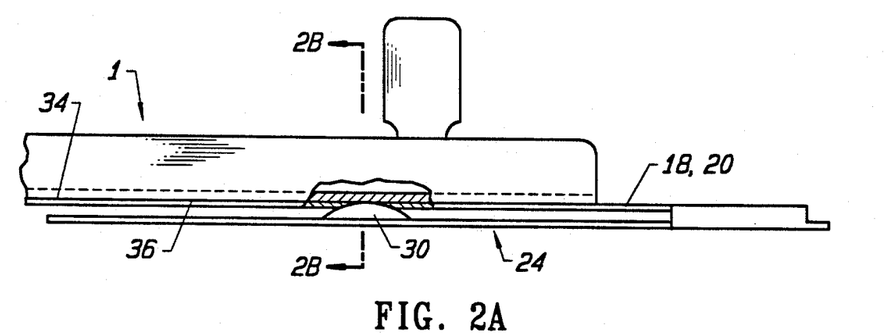
FIG. 2A and 2B are detail drawings showing in cross-section the interrelationship of various parts of the gimbal and load beam of FIG. 1 as assembled.
Figure 2B:
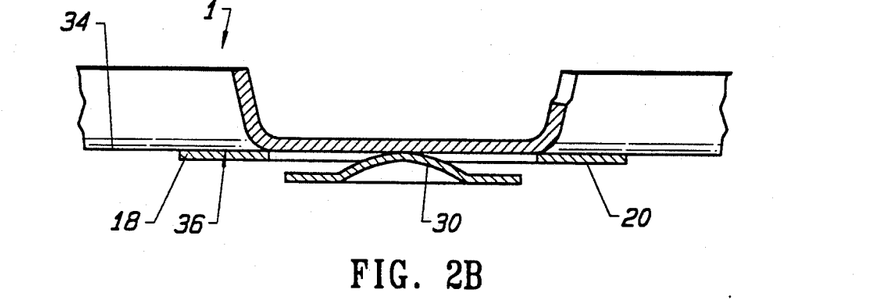

In FIGS. 2A and 2B, the lower surface 34 of the load beam 1 is shown to be coplanar with the upper surface 36 of the gimbal side arms 18, 20. The dimple 30 can easily be seen to be the only point of contact between the load beam 1 and the tongue 24, and therefore the slider (not shown). The slider, therefore, can move about the single point of contact between the dimple 30 and the load beam 1 within the constraint imposed by the stiffness of the tongue 24, and the tongue 24 remains in a plane substantially parallel to the load beam 1.

Referring again to FIG. 1, the tongue 24 of the gimbal 2 also incorporates several small holes 38. These holes 38 are provided to enhance the mechanical bonding of the adhesive used to secure the slider (not shown) to the tongue 24.

Figure 3:
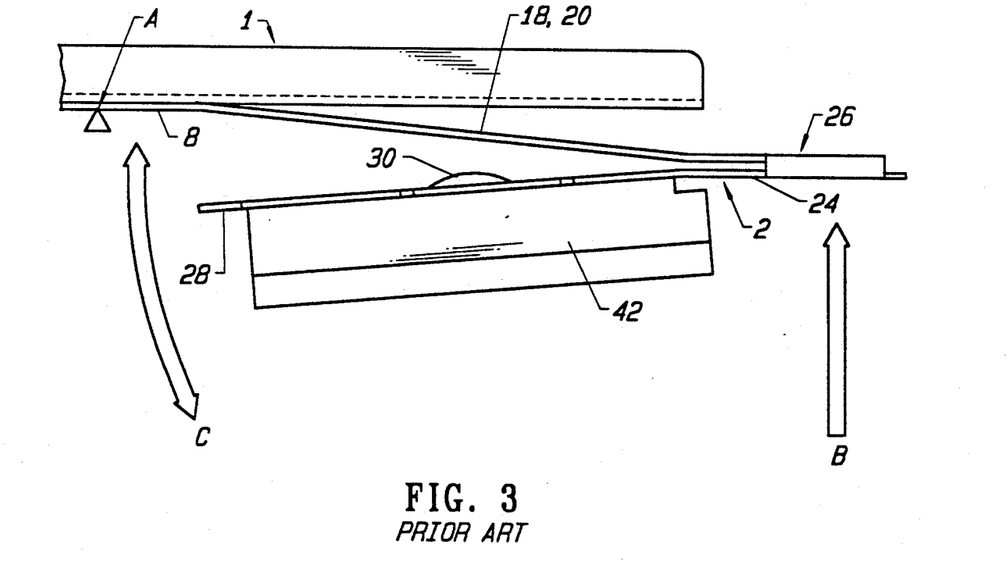
FIG. 3 is a drawing of the prior art head/gimbal/load beam assembly, illustrating the type of failure the present invention is intended to prevent.

FIG. 3 is a side view of a head/gimbal/load beam assembly made in accordance with the prior art practices described above, and illustrating the failure mode inherent in the prior art. In this figure, it is assumed that the load beam 1 is rigidly supported by a ramp or other supporting device, represented at point "A" as it would be when the disc drive is unpowered, and that a shock load is exerted on the disc drive in the direction shown by arrow "B". Since the gimbal 2, as previously noted, is made from thinner material than the load beam 1—and because the mounting portion 8 of the gimbal 2 is welded to the load beam 1—the inertia of the slider 42 will cause the side arms 18, 20 of the gimbal 2 to be bent away from their normal coplanar relationship with the lower surface of the load beam 1 and further cause the tongue 24 to bend at its attached end 26 moving the free end 28 away from the load beam 1 along curve "C", separating the dimple 30 from its intended contact with the load beam 1. It is readily apparent that shock loads of sufficient magnitude could easily result in permanent deformation of the gimbal 2 in the areas of the side arms 18, 20 and at the attached end 26 of the tongue 24. Any such permanent deformation of the gimbal 2 drastically increases the chances of damage to the disc and/or head when an attempt is made to bring the head into the normal "flying" relationship to the disc. Furthermore, if the deformation is severe enough, the head may be incapable of being moved off the ramp and onto the disc surface without first contacting the outer edge of the disc, a condition that would surely result in fatal damage to the entire device.

It can also be seen from FIG. 1 that, since the tongue 24 of the gimbal 2 is attached at only one end 26, any accelerative forces exerted perpendicular to the long axis of the load beam 1 and parallel to the lower surface of the load beam 1 will tend to swing the tongue from side to side within the U-shaped cutout 22, and, if such forces were of sufficient magnitude, permanent deformation of the gimbal 2 in the areas of the ends of the U-shaped cutout 22 and the second tooling hole 16 could occur, again potentially rendering the disc drive inoperative.

Figures 4, 5:
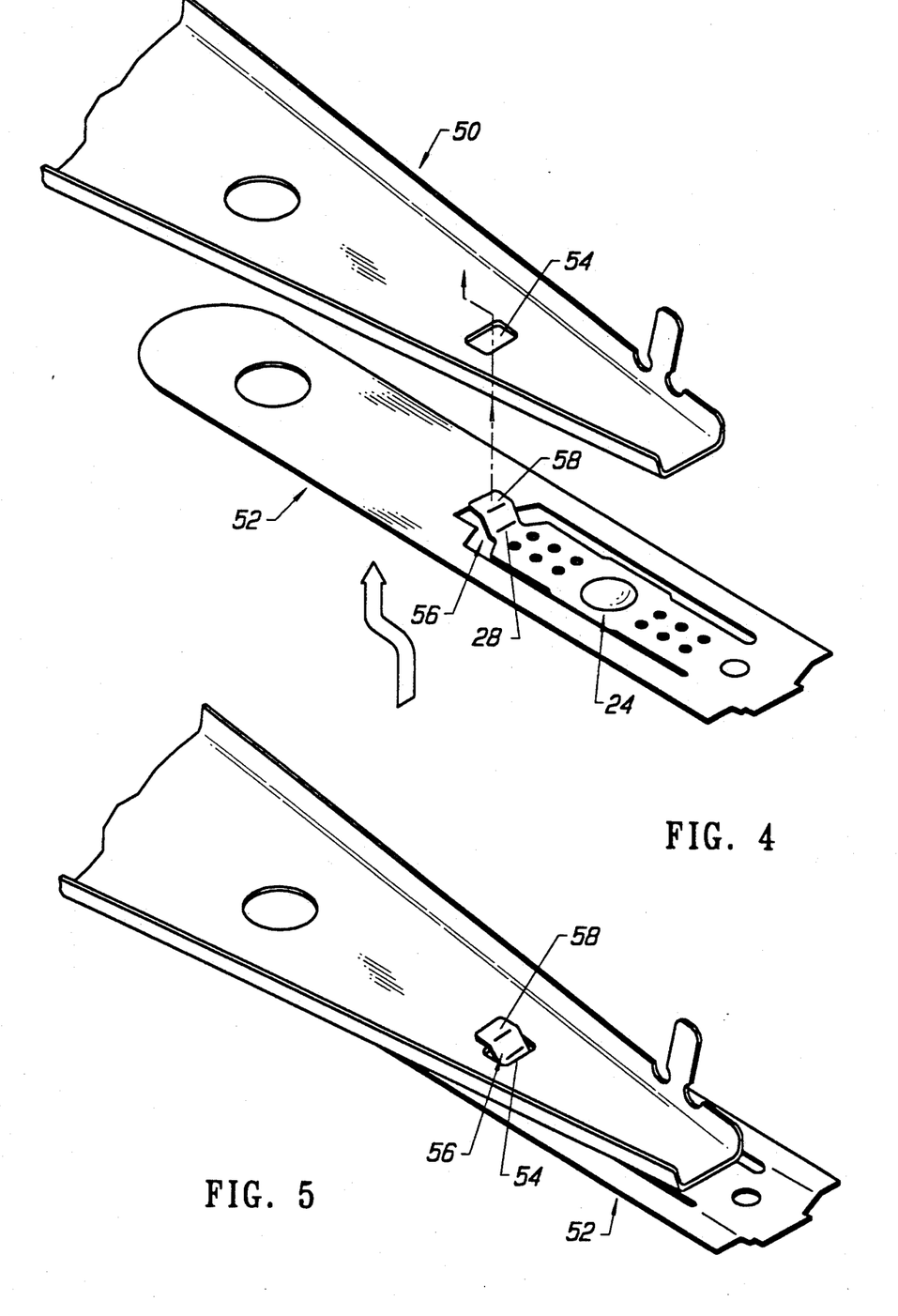

Shown in FIG. 4 in isometric view are the modified load beam 50 and gimbal 52 of the present invention. The load beam 50 has been modified by the addition of a small opening 54.

The gimbal 52 has also been modified by the addition of a small extension 56 to the free end 28 of the tongue 24. This extension is dimensioned and formed in such a way that when the load beam 50 and gimbal 52 are welded together, as shown in FIG. 5, the extension 56 on the free end 28 of the tongue 24 passes through the opening 54 in the load beam 50, and the free end 58 of the extension 56 extends beyond the edge of the opening 54 and over a portion of the load beam 50. As in the prior art, during normal operation the only contact between the load beam 50 and the tongue 24 of the gimbal 52 is at the single point at the tope of the dimple 30. This lack of contact between the extension 56 of the tongue 24 and the opening 54 in the load beam 50 is shown most clearly in FIGS. 6B and 7B.

Figure 6A:
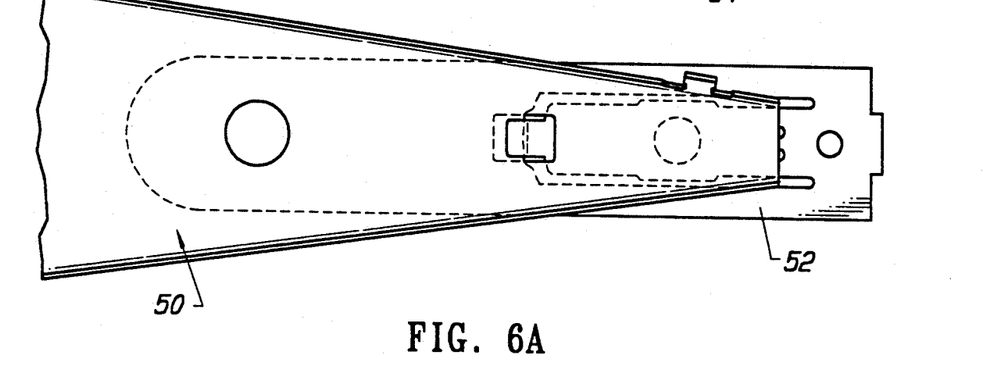
FIG. 6A is a plan drawing of the gimbal and load beam of FIG. 5.
Figure 6B:
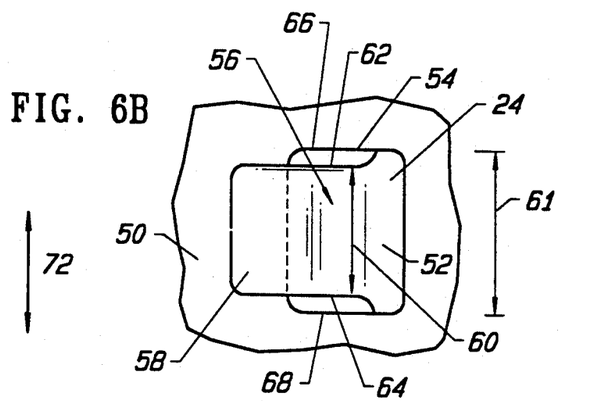
FIG. 6B is a detail of a significant portion of FIG. 6A.

FIG. 6B is a close-up plan view of the opening 54 in the load beam 50 and the extension 56 of the gimbal tongue as seen when the load beam 50 and gimbal are assembled as in FIG. 5. As can clearly be seen, the extension width 60 is less than the opening width 61, and the sides 62, 64 of the extension 56 do not contact the sides 66, 68 of the opening 54.

Figure 7A:
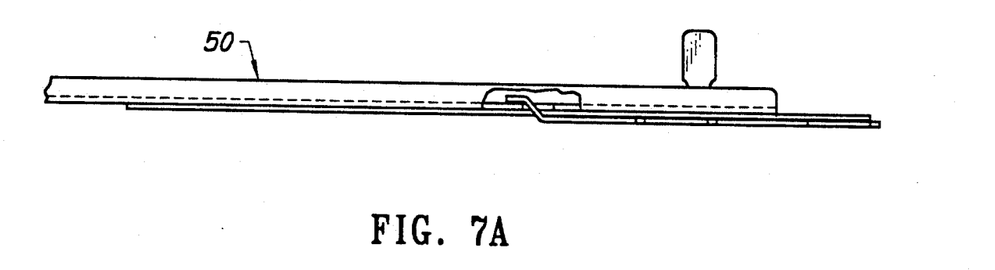
FIG. 7A is a side view of the gimbal and load beam of FIGS. 5, 6A and 6B, with a partial sectional view in the area of the extension of the gimbal tongue and the opening in the load beam of the present invention.
Figure 7B:
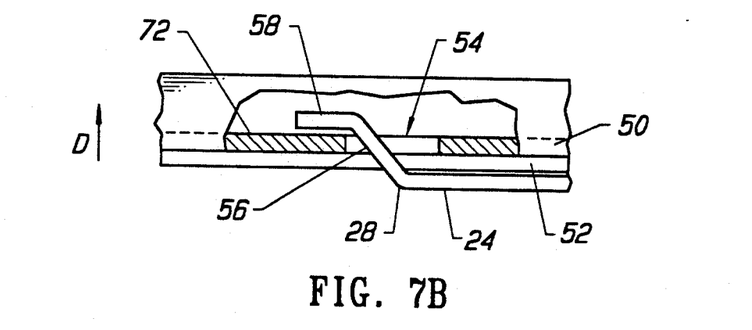
FIG. 7B is a close-up view of the cross-section area of FIG. 7A.

FIG. 7B is a cross-section of the same components, taken along the axis designated "B—B" in FIG. 6B. This figure clearly shows that the extension 56 protrudes through the opening 54 in the load beam 50 but is nowhere in contact with the load beam 50.

The fact that the extension 56 of the gimbal tongue 24 passes through the opening 54 in the load beam 50 but does not contact the load beam 50 during normal operation allows the modified gimbal 52 and load beam 50 of the present invention to operate just as in the prior art.

The true and significant advantages of the present invention become evident if the reader considers the application of shock loads to the system as previously described.

Referring again to FIG. 7B, and assuming again that the load beam 50 is being supported on a ramp or similar device, the application of a shock load in the direction of arrow "D" will tend to flex the tongue 24 of the gimbal 52 downward, but the extension 56 of the tongue 24 will contact the upper surface 72 of the load beam 50 after the tongue 24 has moved through only a short excursion, thus preventing any permanent deformation of the gimbal 52.

Similarly, referring to FIG. 6B, it is equally apparent that any shock loads along the axis of arrow 72 will cause the tongue 24 to move only a very short distance before one side 62, 64 of the extension 56 contacts the side 66, 68 of the opening 54 in the load beam 50. Again, this small movement is not enough to cause permanent deformation of the gimbal 52.

Figures 9, 10:
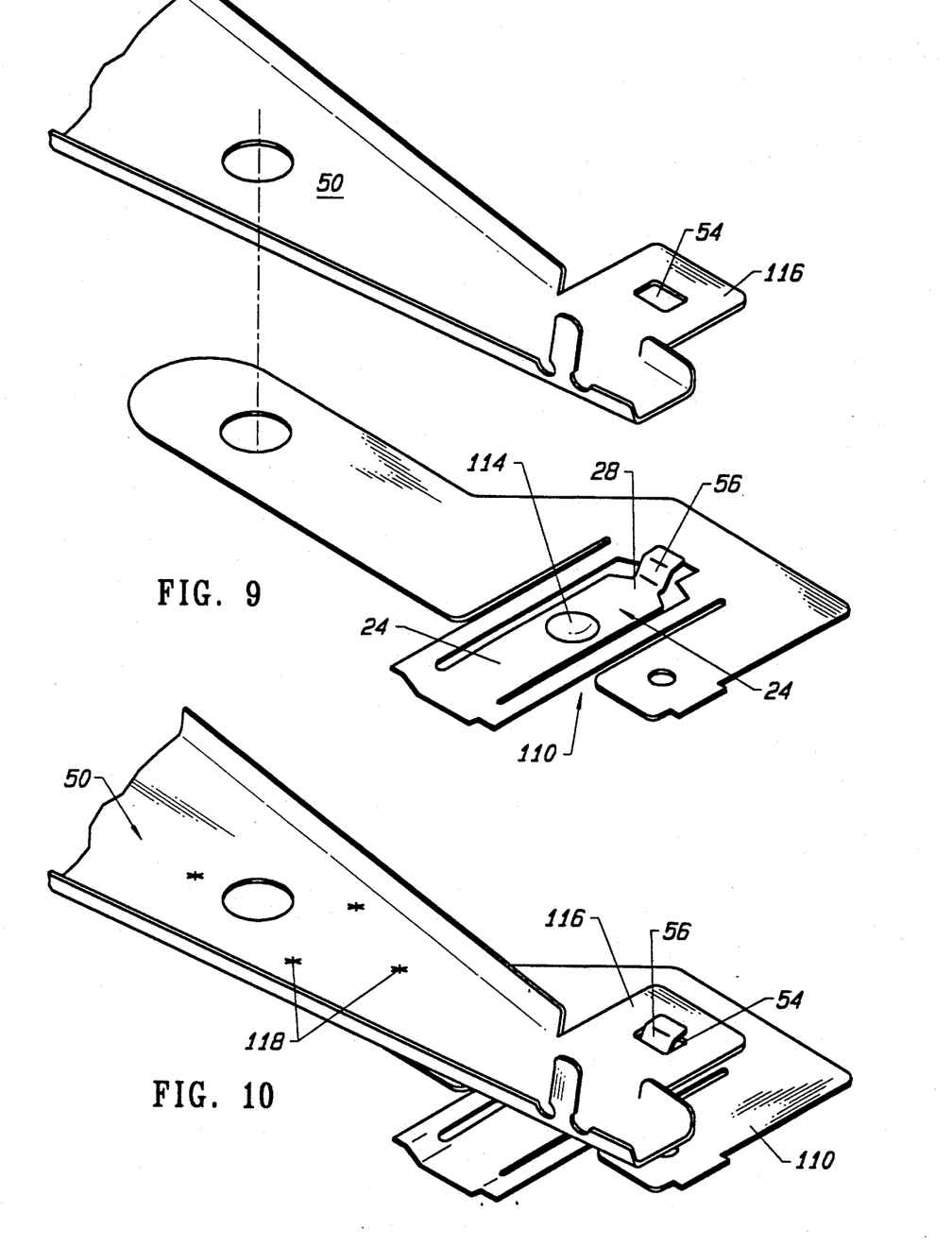
FIG. 9 is an isometric view of another prior art load beam and gimbal.
FIG. 10 is an isometric view of the load beam and gimbal of FIG. 9 as modified to incorporate the present invention.

FIG. 9 shows a modification of a portion of a load beam/gimbal assembly of the type disclosed in U.S. Pat. No. 4,868,694, incorporated herein by reference. The gimbal 110 of this configuration differs from the previously discussed gimbal in having its tongue 112 rotated 90 degrees from the long axis of the load beam 50. It can be seen that the dimple 114 of gimbal 110 lies directly on the long axis of the load beam 50, so that the sole contact point defined by this dimple 114 is unmoved. The load beam 50 and gimbal 110 of this configuration operate as previously discussed.

FIG. 10 shows a portion of a load beam 50 and a gimbal 110 of the type shown in FIG. 9, and showing the modifications necessary to incorporate the present invention. As can be seen, the load bean 50 has been modified by the addition of a tab 116 extending outward from the side of the load beam 50 and incorporating an opening 54. Again, an extension 56 has been added to the free end 28 of the tongue 24 and formed to extend upward from the tongue 24 and then away from the remainder of the tongue 24.

This FIG. 10 shows the load bean 50 and the gimbal 110 of FIG. 9 as they would be assembled together and clearly shows the relationship between the opening 54 int he tab 116 of the load bean 50 and the extension 56 of the tongue of the gimbal 110.

Figure 8:
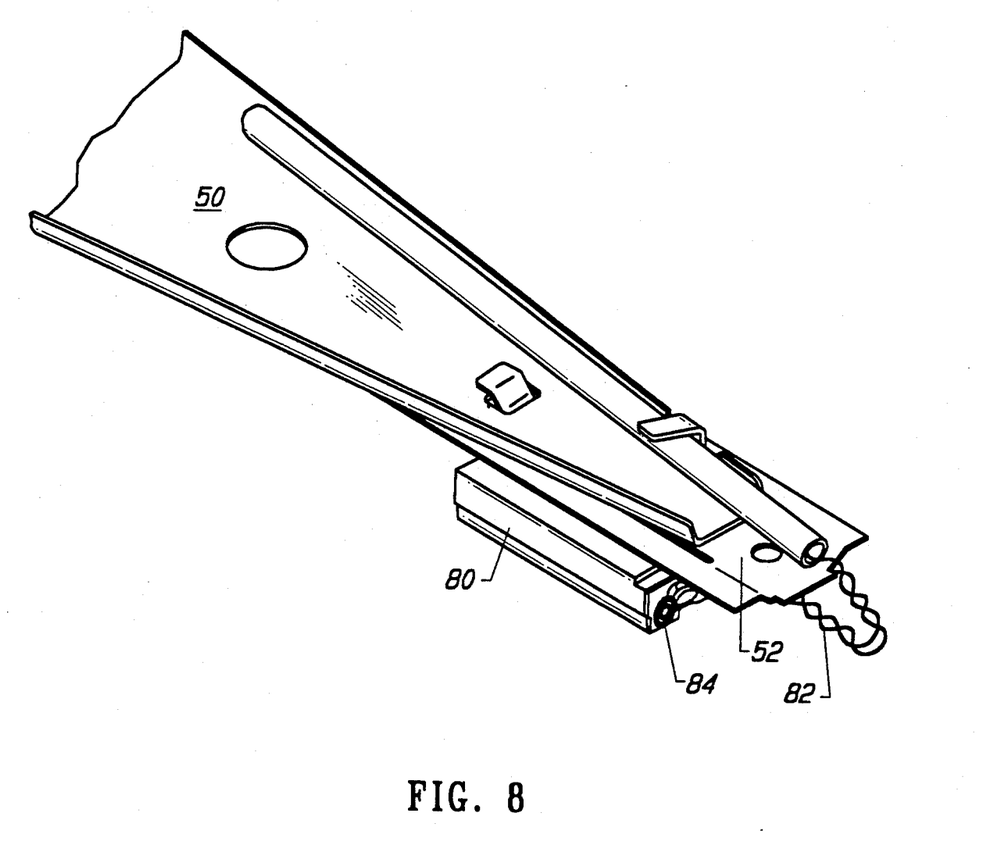
FIG. 8 is an isometric drawing of a complete head/gimbal/load beam assembly made in accordance with the present invention.

FIG. 8 shows the relationship of all parts of a completed head/gimbal/load beam assembly (HGA) incorporating the present invention, including the load beam 50, gimbal 52, head/slider-body assembly 80 and the wires 82 used to conduct electrical signals to and from the read/write head element 84.

In summary, shown is an improved load beam/gimbal arrangement for mounting a read/write head in a disc drive that allows the gimballing action of the prior art, but prevents permanent deformation of the gimbal due to large shock loads. The improvement involves a minimum of changes to the existing parts or tooling and fixtures necessary to assemble them and is easily implemented using existing technology.

Modifications may occur to a person of skill in the art after studying this disclosure. Therefore, the scope of this invention is to be limited only by the following claims.

What is claimed is:

1. In a read/write head assembly for a disc drive, said disc drive containing a plurality of spinning magnetic storage discs and an actuator mechanism suitable for controllably moving a plurality of said read/write head assemblies in co-operative arrangement with said discs, said read/write head assembly including a load beam having first and second ends, the first end of said load beam being adapted for mounting said assembly to said actuator, said read/write head assembly also including a gimbal having first and second ends, said first end of said gimbal being fixedly attached to said load beam at a point located between said first end of said load beam and said second end of said load beam, said second end of said gimbal extending in the direction of said second end of said load beam, said gimbal including a U-shaped cutout portion having a closed end and an open end and oriented such that said closed end of said U-shaped cutout is toward said first end of said gimbal and said open end of said U-shaped cutout is toward said second end of said gimbal, said U-shaped cutout defining a tongue having an attached end at said open end of said U-shaped cutout and a free end at said closed end of said U-shaped cutout, said U-shaped cutout also defining, between the outside edges of said U-shaped cutout and the outside edges of said gimbal, a pair of side arms extending in parallel with said tongue, said gimbal being shaped to displace said tongue away from said load beam, said tongue having a dimple formed therein extending toward said load beam and dimensioned to contact said load beam at a dimple point of contact and maintain said tongue in a plane substantially parallel to said load beam, said read/write head assembly further comprising a head/slider sub-assembly incorporating a read/write head suitably mounted on a slider-body adapted to carry said read/write head into co-operative arrangement with said discs, said head/slider sub-assembly being attached to said tongue and facing away from said load beam; the improvement comprising:

motion-restricting means for limiting the extent of relative motion between said load beam and said gimbal tongue due to accelerative forces to a range of motion smaller than the range of motion that will cause a permanent deformation of said gimbal so that relative motion between said load beam and said gimbal due to accelerative forces sufficient to cause permanent deformation of said gimbal is prevented, said motion restricting means comprising means integral with said free end of said tongue connecting said free end of said tongue and said load beam at a region of said load beam intermediate between said gimbal attachment point and said dimple point of contact to limit motion of said tongue relative to said load beam, and thus preventing permanent deformation of said gimbal by said forces.

2. In a read/write head assembly for a disc drive, said disc drive containing a plurality of spinning magnetic storage discs and an actuator mechanism suitable for controllably moving a plurality of said read/write head assemblies in co-operative arrangement with said discs, said read/write head assembly including a load beam having first and second ends, the first end of said load beam being adapted for mounting said assembly to said actuator, said read/write head assembly also including a gimbal having first and second ends, the first end of said gimbal being fixedly attached to said load beam at a point located between said first end of said load beam and said second end of said load beam, said second end of said gimbal extending in the direction of said second end of said load beam, said gimbal including a U-shaped cutout portion having a closed end and an open end and oriented such that said closed end of said U-shaped cutout is toward said first end of said gimbal and said open end of said U-shaped cutout is toward said second end of said gimbal, said U-shaped cutout defining a tongue having an attached end at said open end of said U-shaped cutout and a free end at said closed end of said U-shaped cutout, said U-shaped cutout also defining, between the outside edges of said U-shaped cutout and the outside edges of said gimbal, a pair of side arms extending in parallel with said tongue, said gimbal being shaped to displace said tongue away from said load beam, said tongue having a dimple formed therein extending toward said load beam and dimensioned to contact said load beam and maintain said tongue in a plane substantially parallel to said load beam, said read/write head assembly further comprising to head/slider sub-assembly incorporating a read/write head suitably mounted on a slider-body adapted to carry said read/write head into co-operative arrangement with said discs, said head/slider sub-assembly being attached to said tongue and facing away from said load beam; the improvement comprising:

motion-restricting means for limiting the extent of relative motion between said load beam and said gimbal tongue due to accelerative forces to a range of motion smaller than the range of motion that will cause a permanent deformation of said gimbal so that relative motion between said load beam and said gimbal due to accelerative forces sufficient to cause permanent deformation of said gimbal is prevented;

said motion restricting means comprising means connecting said free end of said tongue and said load beam to limit motion of said tongue relative to said load beam;

said connecting means comprising a hole in said load beam and an extension of said gimbal tongue co-operating with said hole and extending therethrough to limit motion of said tongue relative to said load beam;

said motion restricting means thus preventing permanent deformation of said gimbal by said forces.

3. A read/write head assembly as claimed in claim 2, wherein said extension is dimensioned and formed to pass through said hole and extend beyond the limit of said hole.

4. A read/write head assembly as claimed in claim 2, wherein said extension comprises a tab extending substantially vertically from said free end of said tongue through said hole in said load beam.

5. A read/write head assembly as claimed in claim 4, wherein said tab further comprises a portion extending substantially horizontally over the surface of said load beam adjacent said hole and on the opposite side of said load beam from said tongue.

6. A read/write head assembly as claimed in claim 5, wherein said tab is a physical extension of said free end of said tongue.

7. A read/write head assembly as claimed in claim 5, wherein said slider-body is adhesively connected to the surface of said tongue opposite said load beam.

8. An improved gimbal/load beam assembly, for use with a read/write head in a disc drive, said assembly comprising:

a load beam having first and second ends, said first end comprising means for mounting said assembly in said disc drive, said second end comprising an elongated isosceles triangle, said triangle having a base and two long sides, with said base of said triangle toward said first end of said load beam, and said sides of said triangle being formed to stiffen said load beam, and an opening in said load beam;

said assembly further comprising a gimbal having a mounting end and a gimballing end, said mounting end being attached to said load beam between said first and second ends and oriented such that said gimballing end extends in the direction of said second end, said gimballing end comprising head-mounting means for mounting said read/write head, said opening in said load beam being located in a region of said load beam intermediate between said gimbal attachment location and said head-mounting means; and said head-mounting means further comprising limiting means acting in co-operation with said opening in said load beam to limit the extent of relative motion between said head-mounting means and said load beam to range of motion smaller than the range of motion that will cause a permanent deformation of said gimbal so that relative motion between said load beam and said head mounting means due to accelerative forces sufficient to cause permanent deformation of said gimbal is prevented, thereby preventing permanent deformation of said gimbal by said accelerative forces.

9. An improved gimbal/load beam assembly as claimed in claim 8, wherein said head-mounting means comprises:

a tongue formed in said gimballing end of said gimbal, said tongue being formed in said gimbal by a generally U-shaped cutout, said cutout having its continuous end toward said mounting end of said gimbal and its open end toward said gimballing end of said gimbal, said gimballing end being further formed to displace said tongue away from said load beam and into a plane substantially parallel to said load beam;

said tongue further comprising a dimple formed in said tongue and extending in the direction of said load beam and dimensioned to contact said load beam at a single point and maintain said substantially parallel relationship between said load beam and said tongue.

10. An improved gimbal/load beam assembly as claimed in claim 8, wherein said head-mounting means comprises:

a tongue formed in said gimballing end of said gimbal, said tongue being formed in said gimbal by a generally U-shaped cutout, said cutout having its continuous end toward one of said sides of said triangular portion of said load beam and its open end toward the other of said sides of said triangular portion of said load beam, said gimballing end being further formed to displace said tongue away from said load beam and into a plane substantially parallel to said load beam;

said tongue further comprising a dimple formed in said tongue and extending in the direction of said load beam and dimensioned to contact said load beam at a single point and maintain said substantially parallel relationship between said load beam and said tongue.

11. An improved gimbal/load beam assembly for use with a slider supporting a read/write head in a disc drive, said assembly comprising:

a load beam having first and second ends, said first end comprising means for mounting said assembly in a disc drive, said second end comprising means for supporting said gimbal including a region for attaching said gimbal to said load beam and an opening with said second end for flexibly coupling said gimbal to said load beam, said gimbal having a mounting end and a gimballing end, said mounting end being permanently attached to said load beam at said second region and oriented such that said gimballing extends in the direction of the second end of the load beam, said gimballing end comprising slider mounting means for mounting said slider which are flexible relative to said gimbal and said load beam, said slider mounting means including an extension integral with said gimballing end cooperating with said opening to limit the extent of relative motion between said slider mounting means of said gimbal and said load beam to a range of motion smaller than the range of motion that will cause a permanent deformation of said gimbal so that relative motion between said load beam and said slider mounting means due to accelerative forces sufficient to cause permanent deformation of said gimbal is prevented, thereby preventing permanent deformation of said gimbal by forces imposed thereon.

12. An improved gimbal/load beam assembly for use with a slider supporting a read/write head in a disc drive, said assembly comprising:

a load beam having first and second ends, said first end comprising means for mounting said assembly in a disc drive, said second end comprising means for supporting said gimbal including a region for attaching said gimbal to said load beam and an opening within said second end for flexibly coupling said gimbal to said load beam;

said gimbal having a mounting end and a gimballing end, said mounting end being permanently attached to said load beam at said second region and oriented such that said gimballing extends in the direction of the second end of the load beam, said gimballing end comprising slider mounting means for mounting said slider which are flexible relative to said gimbal and said load beam;

said slider mounting means comprising an extension cooperating with said opening to limit the extent of relative motion between said slider mounting means and said load beam to a range of motion smaller than the range of motion that will cause a permanent deformation of said gimbal so that relative motion between said load beam and said slider mounting means due to accelerative forces sufficient to cause permanent deformation of said gimbal is prevented; and a tongue defined in said gimballing end of said gimbal by a U-shaped cutout in said gimbal, said U-shaped cutout having a closed end and an open end, the region of said tongue defined by said closed end of said cutout including said extension cooperating with said opening to limit motion of said tongue relative to said load beam, thus preventing permanent deformation of said gimbal by said accelerative forces imposed thereon.

13. An improved gimbal/load beam assembly as claimed in claim 12, wherein said tongue lies in a plane displaced from but substantially parallel to the plane of said load beam, said extension extending from the plane of said tongue though the plane of said load beam and through said opening in said load beam, whereby both horizontal and vertical motion of said tongue relative to said load beam is limited.

14. An improved gimbal/load beam assembly as claimed in claim 13, wherein said extension extends out over the surface of said load beam after passing through said opening in said load beam.

15. Am improved gimbal/load beam assembly as claimed in claim 14, wherein said tongue extends parallel to an axis extending from said first end to said second end of said load beam, and said extension passes through said opening at a point between the region where said gimbal is fastened to said load beam and said second end of said load beam.

16. An improved gimbal/load beam assembly as claimed in claim 14, wherein said tongue extends perpendicular to an axis extending from said first end to said second end of said load beam.

17. An improved gimbal/load beam assembly as claimed in claim 16, wherein said opening is displaced from said axis so that said gimbal and said tongue are balanced relative to said axis of said load beam.

18. Am improved gimbal/load beam assembly as claimed in claim 12, wherein said tongue includes a dimple on a surface thereof facing said load beam and normally in contact with said load beam, the extension being so dimensioned and located as to extend through said opening in said load beam without touching the sides and top surface of said load beam in the absence of unusual forces imposed on said gimbal.

* * * * *